R. L. SHEWARD.
WEEDLESS TANDEM BAIT CASTING HOOK.
APPLICATION FILED JULY 6, 1908.
915,707.
Patented Mar. 16, 1909.
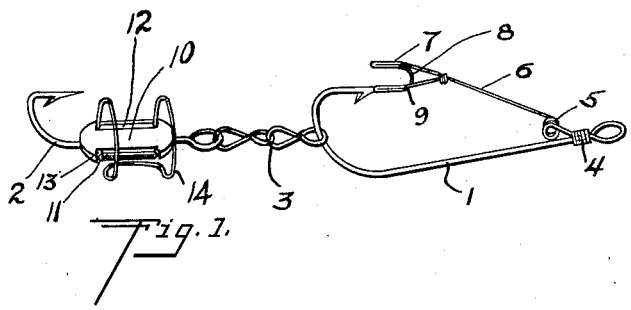
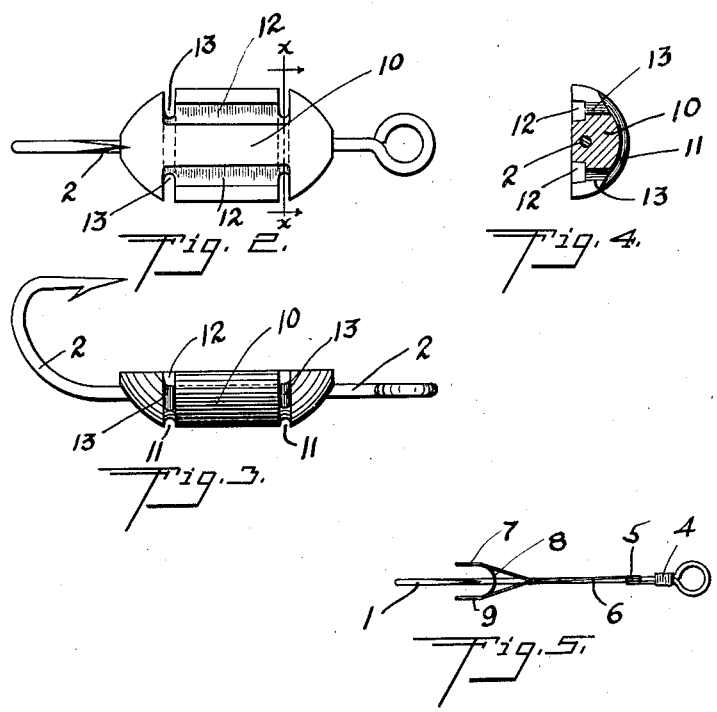
Ralph L. Sheward, Inventor,
Witnesses:
C. R. McKay
Roy G. Kraz
By David O. Barnell,
Attorney.

UNITED STATES PATENT OFFICE.

RALPH L. SHEWARD, OF COUNCIL BLUFFS, IOWA.

WEEDLESS TANDEM BAIT-CASTING HOOK.

No. 915,707.　　Specification of Letters Patent.　Patented March 16, 1909.

Application filed July 6, 1908. Serial No. 442,217.

*To all whom it may concern:*

Be it known that I, RALPH L. SHEWARD, a citizen of the United States, and a resident of Council Bluffs, in the county of Pottawattamie and State of Iowa, have invented certain new and useful Improvements in Weedless Tandem Bait-Casting Hooks, of which the following is a specification.

My invention relates to fishing hooks, more particularly to that class known as weedless tandem bait-casting hooks, and comprising a leader hook having a weed guard for the point thereof and a trailer hook provided with a weight having means for the attachment of a bait thereto.

It is the object of my invention to provide an improved guard for the leader hook and an improved form of weight for the trailer hook whereby the secure attachment of the bait thereto is facilitated.

In the accompanying drawings Figure 1 is a perspective view of a hook embodying my invention, Fig. 2 is a plan view of the weighted trailer hook, Fig. 3 is a side elevation of the same, Fig. 4 is a transverse section of the weight on the line *x*—*x* of Fig. 2, and Fig. 5 is a plan view of the leader hook.

In the construction shown I provide a leader hook 1 of ordinary form, to which the trailer hook 2 is flexibly connected by means of a short double-linked chain 3 of which one end is connected with the eye of the trailer hook while the other end link is passed over the barb and around onto the main bend of the leader hook.

The leader hook is provided with a weed guard formed of spring wire as follows: One end of the spring wire is attached to the shank of the hook near the eye thereof by lashing with fine wire and soldering. Adjoining the lashing 4 a coil 5 is formed, of which the axis extends transversely to the shank of the hook. From the coil 5 the wire 6 extends upwardly and rearwardly to a point in front of the point of the hook where it is bent laterally and then rearwardly to form the portion 9 which extends past the point of the hook slightly above and to one side of the same. At the end of the portion 9 the wire is turned forwardly, formed into a U-bend 8 which is passed around and slightly above the point of the hook, and then is again turned forwardly as the portion 7, returned to the upper end of the portion 6 and coiled around the same. The portions 7 and 9 are arranged symmetrically on each side of the point of the hook, the side portions of the U-bend 8 being parallel with and just below the rearward parts of the portions 7 and 9, and are soldered thereto in order to prevent the same becoming separated and thereby forming a loop which might catch on weeds or the like. The action of the guard in deflecting the hook away from weeds or the like will be apparent, as also the fact that, the guard not being in actual engagement with the hook point, it may be readily sprung aside or downward so as to expose the point of the hook when pushed suddenly as by the strike of a fish.

The weight 10 is preferably formed of some easily fusible metallic alloy, such as a Babbitt or type-metal composition, and is cast upon the straight portion of the shank of the trailer hook 2 at substantially the position shown. The general form of the weight is that of half a cylinder cut on its axis and having rounded tapering ends approximating the form of a segment of a circular spindle. The shank of the trailer hook passes through the weight slightly below the flat upper surface thereof, substantially parallel with the axis of the cylindical portion of the same, and said flat upper surface is substantially perpendicular to the plane of the main bend of the hook. At each end of the cylindrical portion of the weight in the rounded lower side thereof is formed a circumferential or transverse groove 11. In the flat upper surface of the weight are formed the longitudinal grooves 12 which extend parallel with and near the edges of the cylindrical portion of the weight between the circumferential or transverse grooves 11, and each of the ends of said grooves 12 is connected with one of the grooves 11 by a short vertically-extending notch 13.

In placing a bait upon the device, the nose portion of the bait is impaled by the leader hook 1 and the body of the bait is placed on the flat upper surface of the weight 10 and secured thereon by means of an elastic band 14. A portion of the band is laid in one of the longitudinal grooves 12, each end of the said portion being then passed down through the notches 13 and around the lower side of the weight in the grooves 11. The two sides of the band are then passed up over the bait and around the same and again passed around under the weight in the grooves 11, and the remaining end loop of the band is passed up through the notches 13 at the opposite side of the weight and into the longitudinal groove 12. In Fig. 1 the band is shown in the position assumed thereby just before the final looping of the band into the notches 13 and groove 12.

The tandem hook is especially adapted for use with frogs or similar live bait and, when the device is used with bait of this class, the soft body is pressed down slightly over the sides of the weight thereby effectually preventing the band 14 from becoming detached from the weight. The portions of the band which lie in the grooves 11 are so protected that they will not be easily displaced therefrom, and the tapered ends of the weight cause it to easily slide over any obstructions which it may encounter, without catching thereon. The two sides of the band 14 which pass over the back of the bait, being held separated by the grooves 11, hold the bait more effectually and firmly upon the weight than would a single cord or band passing over the back of the bait at but one point. The position of the bait upon the weight is such that it serves as a guard for the point of the hook sufficient to prevent weeds catching thereon. In the use of the hook in casting and trolling the same is handled and operated in the same manner as other hooks of this class, being drawn through the water slowly or rapidly as desired, the weight 10 causing the bait to fall with the back up and move through the water in natural and life-like position.

Now, having described my invention, what I claim and desire to secure by Letters Patent is:

1. In a fishing device of the class described, a hook, a weight carried on the shank of the hook, said weight comprising a semicylindrical body having tapered ends, there being transverse grooves extending around the lower side of the weight adjacent to the ends thereof, there being longitudinally extending grooves in the upper side of the weight adjacent to the edges thereof, there being notches connecting the ends of the longitudinal grooves with the ends of the transverse grooves, and means engaging the weight in the grooves thereof and adapted to pass over the back of the bait to hold the same upon the weight.

2. In a fishing device of the class described, a hook, a weight carried on the shank of the hook, said weight comprising a semicylindrical body with tapered ends and a flat upper surface disposed substantially perpendicular to the main bend of the hook, there being transverse grooves extending around the lower side of the weight near the ends thereof and longitudinally extending grooves in the upper side of the weight near the sides thereof, the adjoining ends of the grooves being connected with each other, and an endless elastic band for securing a bait upon the weight, said elastic band having portions thereof disposed in each of the longitudinal grooves and passing therefrom around the lower side of the weight in the transverse grooves, and portions adapted to extend up over the weight and bait in two loops vertically alined with the transverse grooves.

In testimony whereof I have hereunto subscribed my name in the presence of two witnesses.

RALPH L. SHEWARD.

Witnesses:
D. O. BARNELL,
ROY G. KRATZ.